Aug. 28, 1962 R. N. BENNETT ETAL 3,051,091
GEAR PUMP OR MOTOR
Filed Nov. 18, 1959 2 Sheets-Sheet 2

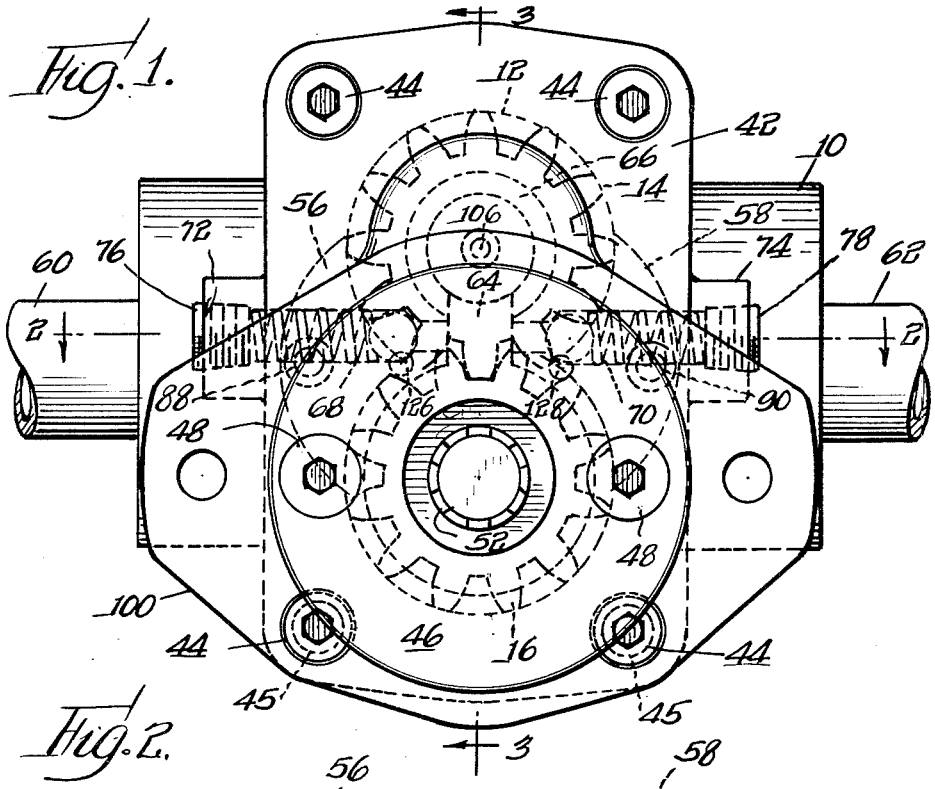

INVENTORS
Robert N. Bennett
Rex W. Vaughan
By: Paul J. Rose Jr. atty.

3,051,091
GEAR PUMP OR MOTOR
Robert N. Bennett and Rex W. Vaughan, Gilroy, Calif., assignors, by mesne assignments, to Be-Ge Manufacturing Company, Gilroy, Calif., a corporation of California
Filed Nov. 18, 1959, Ser. No. 853,767
3 Claims. (Cl. 103—126)

This invention relates generally to gear pumps, and more particularly to gear pumps having pressure balanced wear plates. The device of the invention can be used as a motor and can employ a gas, such as air, as a working fluid, although it will be described as a pump for hydraulic fluid, such as oil.

The principal object of the invention is to provide an improved gear pump of the type having pressure balanced wear plates which also serve as bearing housings or bushings for the gear shafts. In conventional pumps of this type, the hydraulic forces acting on each wear plate have a tendency to cock the wear plate, as will be more fully explained hereinafter, so that excessive wear occurs on the end of the wear plate adjacent the gear face, on the low pressure side of the pump, and so that the bearing loads are concentrated at the end of each bearing adjacent the gear face, decreasing bearing life.

It is therefore another object of the invention to provide means for counteracting the tendency of the wear plates to cock.

A further object of the invention is to provide a gear pump or motor having pressure balanced wear plates which also serve as bushings or bearing housings for the gear shafts, said gear pump or motor being rotatable in either direction.

A still further object of the invention is to provide a reversible gear pump or motor having pressure balanced combination wear plates and bushings or wear plates and bearing housings wherein means is provided to counteract the tendency of said combination wear plates and bushings or wear plates and bearing housings to cock.

These and other objects of the invention will appear from time to time as the following specifications proceeds and with reference to the accompanying drawings wherein:

FIGURE 1 is an end view of the gear pump or motor looking axially of the gear shafts;

FIGURE 2 is a fragmentary plan view shown partially in section along line 2—2 of FIGURE 1;

Figure 6:
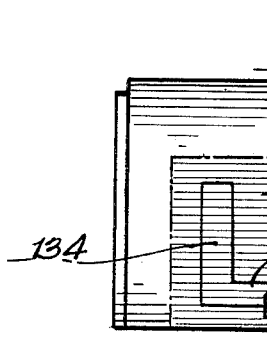
Figure 7:
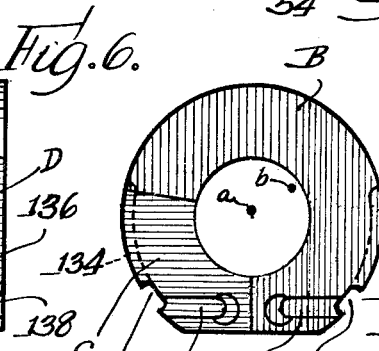

FIGURE 6 is a view of the periphery of a combination wear plate and bearing housing having a shaded area approximately representing the portion of the periphery subject to low pressure when the respective relief groove is in communication with the low pressure side of the pump; and FIGURE 7 is an end view of a combination wear plate and bearing housing, showing the end adjacent the respective gear and having differently shaded areas, the smaller area representing approximately the portion of that end subject to low pressure, and the larger area representing approximately the portion of that end subject to pressure higher than the inlet pressure.

Figure 3:
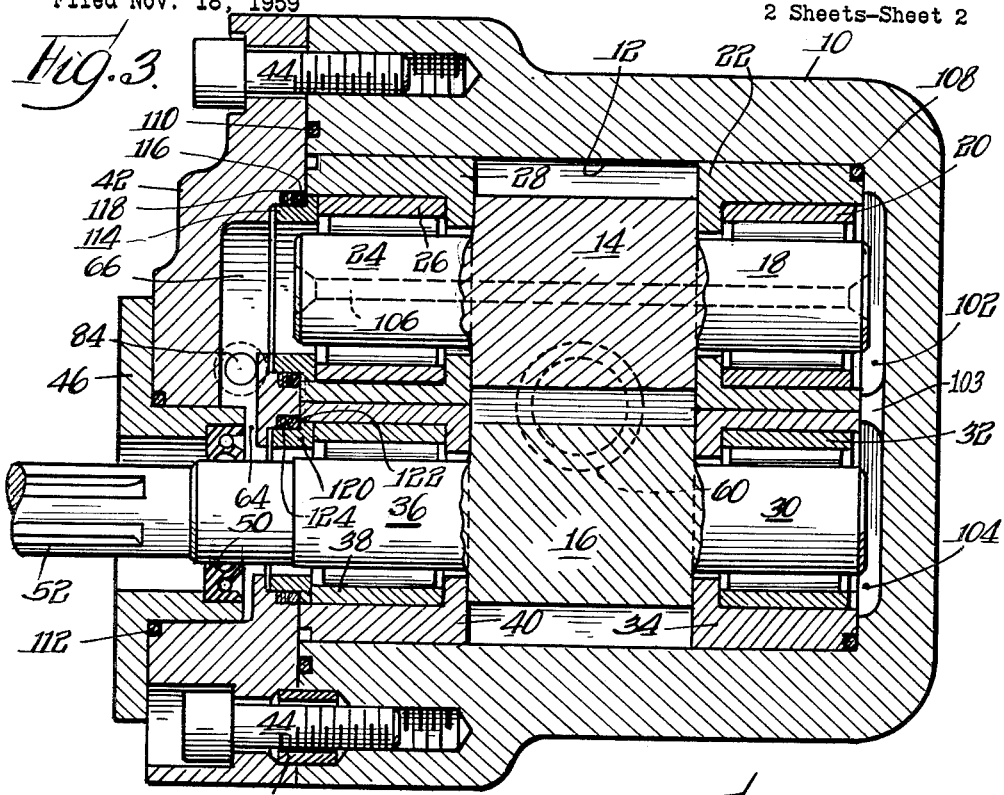
FIGURE 3 is sectional view taken along line 3—3 in FIGURE 1.
Figure 4:
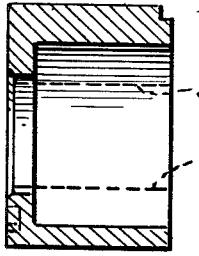
FIGURE 4 is a longitudinal cross-sectional view of a combination wear plate and bearing housing.

In FIGURES 1 to 3, the pump body is indicated by numeral 10 and is provided with a generally "figure 8" shaped recess 12 adapted to receive a pair of intermeshing gears 14, 16 and combination wear plates and bearing housings therefore. Gear 14 is provided with an inner trunnion 18 supported in a roller bearing 20 mounted in an inner combination wear plate and bearing housing 22 in recess 12. An outer trunnion 24 of the gear 14 is supported in a roller bearing 26 mounted in an outer combination wear plate and bearing housing 28 in recess 12. Similarly, gear 16 is provided with an inner trunnion 30 supported in a roller bearing 32 mounted in an inner combination wear plate and bearing housing 34 in recess 12. An outer trunnion 36 of the gear 16 is supported in a roller bearing 38 mounted in an outer combination wear plate and bearing housing 40 in recess 12. The four combination wear plates and bearing housings 22, 28, 34, and 40 may be identical, but the inner two 22 and 34 are subject to different pressures from those exerted on the outer two 28 and 40, as will be hereinafter explained. It will also be understood by those skilled in the art that the combination wear plates and bearing housings 22, 28, 34, and 40 and their respective roller bearings 20, 26, 32, and 38 may be replaced by combination wear plates and bushings having inner diameters substantially equal to those of shaft ends 18, 24, 30, and 36, as indicated by dotted lines 39, 41 in FIGURE 4.

The recess 12 is closed at its outer end by an end plate 42 secured to housing 10 by a plurality of socket head capscrews 44, two of which may be provided with tubular dowels 45. The outer trunnion 36 of the gear 16 protrudes through a suitable opening in end plate 42 which is provided with a flanged tubular seal housing 46 attached to end plate 42 by socket head capscrews 48. A seal 50 is provided in a recess in seal housing 46 and around trunnion 36 of gear 16. The protruding end of trunnion 36 is splined, as at 52, to form a driving connection.

Figure 5:
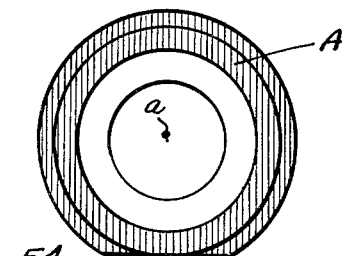
FIGURE 5 is an end view of a combination wear plate and bearing housing, showing the end remote from the respective gear and having a shaded area representing the portion of that end of one of the outer wear plates subject to high pressure.

Each of the four combination wear plates and bearing housings 22, 28, 34, and 40 has a flat surface on its periphery, as indicated at 54 in FIGURE 5. The flat surfaces 54 of wear plates 22 and 34 abut each other in the assembly, and the flat surfaces 54 of wear plates 28 and 40 abut each other. At the inner end of recess 12, the pump body 10 is contiguous to wear plates 22 and 34 all around the peripheries thereof except for abutting surfaces 54 thereof. Similarly, at the outer end of recess 12, the pump body 10 is contiguous to wear plates 28 and 40 all around the peripheries thereof except for abutting surfaces 54 thereof. In the central portion of recess 12, however, the pump body 10 is contiguous to gear 14 substantially only along the upper half of the periphery thereof at a given instant and to gear 16 substantially only along the lower half of the periphery thereof at a given instant, having been made along the lower half of the periphery of gear 14 and along the upper half of the periphery of gear 16 to provide inlet and outlet chambers 56 and 58 opening to opposite sides of pump body 10 through ports to which inlet and outlet pipes 60 and 62 may be connected.

End plate 42 is provided with a cored passage 64 which communicates at one end with the space inside seal 50 around trunnion 36 of gear 16 and at the other end with a cross opening 66 (FIG. 3) opening to the inner side of end plate 42 in alignment with outer trunnion 24 of gear 14. As best shown in FIGURE 2, end plate 42 is also provided with a pair of cross passages 68, 70 communicating with and leading in opposite directions from cored passage 64 and opening to opposite ends of end plate 42 through a pair of bosses 72, 74 thereon. The outer ends of passages 68 and 70 are plugged respectively with a pair of plugs 76, 78, which also serve as seats for a pair of springs 80, 82 respectively provided in passages 68 and 70. A pair of ball check valves 84, 86 is provided respectively at the inner ends of springs 80, 82 in passages 68, 70, which have reduced inner ends to provide valve seats.

End plate 42 is further provided with a pair of passages 88, 90 intersecting passages 68 and 70 respectively and opening to the inside of end plate 42 in alignment respectively with a pair of passages 92, 94 provided in pump body 10 and communicating respectively with chambers 56 and 58. A pair of O-rings 96, 98 seals the junctures of passages 88 with 92 and 90 with 94, respectively. A flange portion 100 is provided on end plate 42 for mounting purposes.

At the inner end of recess 12, the pump body 10 is further provided with a pair of recesses 102 and 104 in alignment with trunnions 18 and 30 of the gears 14 and 16 respectively and joined by a cored passage 103. The gear 14 and inner and outer trunnions 18 and 24 thereof are provided with a central passageway 106. A generally "figure 8" shaped O-ring seal 108 is provided in peripheral grooves at the ends of inner combination wear plates and bearing housings 22 and 34 remote from gears 14 and 16 respectively. A slightly larger generally "figure 8" shaped O-ring seal 110 is provided in a groove in pump body 10 adjacent end plate 42. A circular O-ring seal 112 is provided in a groove on the outer side of end plate 42 adjacent the opening which receives flanged tubular seal housing 46.

Adjacent the outer trunnion 24 of gear 14 is a flanged tubular seal retainer 114 having its flanged end positioned within combination wear plate and bearing housing 28 in abutting relationship to roller bearing 26 and having its other end positioned within a stepped diameter portion of opening 66 in end plate 42. An O-ring seal 116 and leather back-up rings 118 are provided in end plate 42 around seal retainer 114. A seal retainer 120, and O-ring seal 122, and leather back-up rings 124 are provided in similar fashion for outer trunnion 36 of gear 16.

End plate 42 is provided with a pair of passages 126, 128 communicating with passages 68 and 70 respectively and opening to the inside of end plate 42 within a "figure 8" shaped area outside of circular O-ring seals 116 and 122 but inside of generally "figure 8" shaped O-ring seal 110. The passages 126 and 128 contain a pair of ball check valves 130 and 132, respectively, at the ends thereof adjacent pump body 10, and have reduced diameters at the ends communicating with passages 68 and 70, to provide valve seats for the ball check valves 130 and 132. The passages 126 and 128 respectively communicate with passages 68 and 70 on the opposite side of the valve seats for ball check valves 84 and 86 from the cored passage 64.

The device may be used as a pump or as a motor, and in either case, may be operated in either direction. Assuming that it is being used as a pump and that splines 52 and gear 16 are driven clockwise in FIGURE 1, the pipe 62 will be the inlet and chamber 58 will be an inlet chamber, while pipe 60 will be the outlet and chamber 56 will be an outlet chamber. Fluid trapped between the teeth of gear 14 and the wall of recess 12 will be rotated counterclockwise from inlet chamber 58 to outlet chamber 56, and fluid trapped between the teeth of gear 16 and the wall of recess 12 will be rotated clockwise from inlet chamber 58 to outlet chamber 56.

Means have been provided for relieving internal leakage and for "pressure balancing" the combination wear plates and bearing housings, rendering them self compensating for wear. Thus, any build-up of fluid pressure in recess 104 adjacent bearing 32 will cause flow into recess 102 through cored passage 103. Any build-up of fluid pressure in recess 102 will cause flow through passageway 106 in gear 14 and the trunnions 18 and 24 therefor, through opening 66 in end plate 42 and into passage 64. Any build-up of fluid pressure adjacent bearings 26 and 38 will cause flow into passage 64. When the pressure becomes great enough in passage 64, ball check valve 86 will be unseated against the force of spring 82 to allow flow through passages 70, 90, and 94 back to inlet chamber 58. O-ring seal 108 prevents flow of fluid under high pressure into recesses 102 and 104 from along the peripheries of combination wear plates and bearing housings 22 and 34 respectively, while O-ring seals 116 and 122 prevent flow of fluid under high pressure into passage 64 from along the peripheries of combination wear plates and bearing housings 28 and 40, respectively.

There is a net force tending to move inner combination wear plates and bearing housings 22 and 34 axially inwardly of pump body 10. Any high pressure fluid from their peripheries tending to move them outwardly acts only on a small area adjacent O-ring seal 108, while inside of seal 108 pressure has been relieved to substantially inlet pressure, being slightly above inlet pressure in this area due to the force of spring 82 on ball check valve 86. On the faces of wear plates 22 and 34 adjacent gears 14 and 16, there is a pressure gradient arcuately therealong from inlet pressure on one side to outlet pressure on the other side. The area on which this pressure gradient acts is larger than the area in the groove for seal 108. The net result is that wear plates 22 and 34 are forced axially inwardly of pump body 10.

There is also a net force tending to move outer combination wear plates and bearing housings 28 and 40 axially inwardly of pump housing 10. On their faces adjacent gears 14 and 16, there is a pressure gradient arcuately therealong from inlet pressure on one side to outlet pressure on the other side. Substantially full outlet pressure is supplied to the space inside O-ring seal 110 and outside O-ring seals 116 and 122, however, and the area on which this pressure acts is large enough to result in a net force tending to move combination wear plates and bearing housings 28 and 40 axially inwardly of pump body 10. This outlet pressure is supplied through passages 92, 88, 68, and 126, past ball check valve 130, and besides tending to move wear plates 28 and 40 inwardly, it seals back check valve 132 against inlet pressure.

Wear plates 28 and 40 in turn tend to force gears 14 and 16 and wear plates 22 and 34 inwardly, so that any wear is self compensating. The forces between gears 14 and 16 and the wear plates are great enough to prevent undue "slippage" or internal leakage, and yet not great enough to break the lubrication film. The application of pressure to the sides of the wear plates remote from the gears is known in the art as "pressure balancing," although actually the hydraulic forces on opposite sides are not equal.

Operation of the pump in the opposite direction will be readily understood. Thus, if splines 52 and gear 16 are driven counterclockwise in FIGURE 1, pipe 60 will be the inlet and pipe 62 will be the outlet. Pressure in passage 64 due to internal leakage will be relieved through check valve 84 in passage 80, through passages 88 and 92 and back to chamber 56 which is then the inlet chamber. Outlet pressure will be supplied from outlet chamber 58 through passages 94, 90, 70, and 128 and past ball check valve 132 to the wear plates 28 and 40. Operation of the device as a motor will also be readily understood.

In FIGURE 5, the shaded area "A" represents the area on one of the outer combination wear plates and bearing housings subject to high pressure due to the feeding of fluid through either of passages 126 or 128 to the space inside O-ring seal 110 but outside of O-ring seals 116 and 122. The pressure acting on this area "A" may be considered to be the equivalent of a single force acting down into the plane of the paper at point "a" in FIGURE 5, and up out of the plane of the paper at point "a" in FIGURE 7.

In FIGURE 7, the shaded area "B" represents the approximate area on a combination wear plate and bearing housing adjacent one of the gears which may be considered subject to pressure greater than the pump inlet pressure. This area is actually subject to a pressure gradient, the portion adjacent the outlet chamber being subject to outlet pressure and the pressure on the remaining portion progressively decreasing along the face substantially to the inlet pressure as the inlet chamber is approached. The pressure acting on this area "B" may be considered to be the equivalent of a single force acting down into the plane of the paper at point "*b*" in FIGURE 7. The shaded area "C" in FIGURE 7 represents the area subject to inlet pressure, which may be considered negligible.

The force at point "*b*" would be the same for all of the combination wear plates and bearing housings. The force at point "*a*" would be smaller for inner wear plates 22 and 34 than for outer wear plates 28 and 40, since on the inner wear plates the area under pressure is smaller. The inner wear plates 22 and 34 are held firmly against the pump body 10 at the inner end of recess 12 by the pressure on the faces thereof adjacent gears 14 and 16, respectively, and further, by the pressure from wear plates 28 and 40 acting through gears 14 and 16, and these inner wear plates do not appear to have any tendency to cock. However, the outer wear plates 28 and 40 tend to cock in such a manner as to force the portion of each adjacent the inlet chamber against the respective gear. This is because the force at point "*b*," although smaller than the force at point "*a*" on each of the outer wear plates, acts at so much greater a distance from the center of the respective trunnion. One of the objects of the invention is to provide means for counteracting the tendency of the outer wear plates to cock due to the forces acting at the respective points "*b*."

The combination wear plates and bearing housings are floatingly mounted in recess 12 of the pump body 10, in order that they may be self-compensating for wear. When the pump is in operation, a film of high pressure oil seeps around the periphery of each wear plate. By relieving this high pressure along a portion of each outer wear plate, as hereinafter explained, a means is provided for counteracting the tendency of the outer wear plates to cock due to the forces acting at the respective points "*b*." The inner wear plates may be identical to the outer wear plates.

In FIGURE 6, an L-shaped groove has been provided on the periphery of the wear plate, including a groove 134 running circumferentially thereof and a groove 136 running from groove 134 to the face of the wear plate adjacent the respective gear in the assembly. By means of these grooves, an area on the periphery of the wear plate approximately represented by the shaded area "D" is bled to the low pressure inlet chamber. Excluding the shaded area "D" and a corresponding diametrically opposite area from consideration, the high pressure forces on opposite sides of the periphery might be said to be approximately balanced, and do not tend to cock the wear plate. The high pressure forces on the corresponding area diametrically opposite area "D" are not balanced, however, since area "D" is bled to low pressure, and these forces opposite area "D" tend to cock the wear plate oppositely to the direction of cocking tendency due to the force at point "*b*." The tendency of the wear plate to cock is thereby eliminated, and excessive wear on the face of the wear plate adjacent the gear in the vicinity of the inlet chamber is eliminated. The loading of the roller bearings is uniform along the length of the rollers, rather than being concentrated at their ends.

It should be understood that actually there is no definite low pressure area "D" bounded by high pressure areas. These areas are variable and depend on fits and finish of the wear plates and body bore. Further, the pressures in these areas are not uniform. Definite areas and uniform pressures may be assumed, however, merely for convenience of explanation and ease of understanding.

It should be further understood that grooves 134 and 136 do more than counterbalance the cocking tendency due to the force at point "*b*," and that as a result of the lowered pressure in area "D," the wear plate is forced firmly against the wall of recess 12 adjacent the low pressure side of the pump, and the wear plates on opposite sides of each gear are thus held firmly in alignment.

A groove 139 (FIGURE 7) is provided on the face of the wear plate to relieve oil trapped between the meshing gears and bleed it back to the high pressure side of the pump.

In order that the pump or motor may be rotated in either direction, the wear plates are made symmetrical by the provision of relief grooves 135 and 137, corresponding to the grooves 134 and 136, respectively, and by the provision of groove 138, corresponding to groove 139. Although groove 138 connects with groove 136, and groove 139 connects with groove 137, there is no functional purpose in these connections, it being understood that L-shaped groove 134—136 and groove 139 perform their separate functions when the pump is operating in one direction, and L-shaped groove 135—137 and groove 138 perform their separate functions when the pump is operating in the other direction.

It will be seen that we have provided a device which can be used as a gear pump or gear motor, in which the gears can be rotated in either direction, in which pressure balanced wear plates are provided which also serve as bearing housings or bushings for gear trunnions, and in which means are provided for eliminating any tendency of the wear plates to cock.

It will be understood that variations and modifications may be made in the structure of the device without departing from the spirit and scope of the invention, an obvious variation being the location of grooves 134, 135, 136, and 137 in the pump body 10 rather than in the wear plates.

We claim:

1. In a generally cylindrical wear plate for a pressure-balanced self-compensating wear plate type gear pump, said plate having a central gear trunnion receiving aperture therein and having a chordal flat on the periphery thereof for abutment with an adjacent wear plate and having a face adjacent a pump gear exposed to unequal fluid pressures tending to cock said wear plate and having a periphery exposed to high fluid pressures; the improvement comprising a pressure relieving groove in the periphery of the wear plate extending circumferentially thereabout on the side adjacent the inlet chamber of the pump for substantially 90 degrees from adjacent said chordal flat thereof whereby to provide a low pressure area on said periphery, said groove at its end adjacent said flat extending to the face thereof adjacent said pump gear; and another groove in said face of the plate extending part way across the same parallel to the chordal flat from and communicating with the adjacent end of the first named groove, whereby the tendency of said wear plate to cock is counteracted.

2. A gear pump comprising a pair of intermeshing gears, a body closed at one end but initially open at the other end and provided with an internal chamber shaped to fit about the unmeshed portions of the gears in rotative and axially slidable relation, and extending axially beyond the gears on opposite sides thereof, the body having opposed inlet and outlet ports, trunions projecting from the ends of the gears, means mounted in the body chamber between the closed end of the body and the adjacent side of the gears turnably supporting the adjacent trunnions, wear and trunnion-mounting plates of generally cylindrical form fitting and axially slidable in the body chamber on the opposite sides of the gears and at their inner ends substantially engaging against said opposite sides of the gears, said wear plates turnably supporting the adjacent trunnions and being formed with chordal flats engaging each other, an end plate secured on the body and closing said other end thereof, the inner face of the end plate substantially engaging the outer ends of the wear plates, the adjacent trunnion of one gear projecting through the related wear plate and the end plate, and means for feeding outlet pressure against the outer ends of the wear plates at the area of abutment of said chordal flats thereof; said last named means comprising a passage in the end plate, means placing said passage in communication with high pressure within the body as developed at the closed end of the body by gear rotation, a transverse passage in the end plate spaced from said projecting trunnion in the direction of the other trunnion, the transverse passage being closed at its laterally outer end and at its inner end communicating with the first named passage, a check valve in the transverse passage closing toward the first named passage, another passage in the end plate and the body leading from the transverse passage beyond the check valve to the inlet port, and a third passage in the end plate leading from the transverse passage beyond the check valve to the inner face of the end plate at a point thereon such as to overlie the outer ends of both wear plates adjacent said abutting chordal flats thereof.

3. A structure, as in claim 2, with a check valve in the third passage closing in the direction of the transverse passage.

References Cited in the file of this patent

UNITED STATES PATENTS

| | | |
|---|---|---|
| 2,420,622 | Roth et al. | May 13, 1947 |
| 2,444,165 | Lauck | June 29, 1948 |
| 2,682,836 | Orr | July 6, 1954 |
| 2,772,638 | Nagely | Dec. 4, 1956 |
| 2,793,595 | Lauck | May 28, 1957 |
| 2,816,510 | Jarvis | Dec. 17, 1957 |
| 2,824,522 | Compton | Feb. 25, 1958 |
| 2,824,523 | Campbell et al. | Feb. 25, 1958 |
| 2,855,856 | Murray et al. | Oct. 14, 1958 |
| 2,865,302 | Murray | Dec. 23, 1958 |
| 2,866,416 | Oliver | Dec. 30, 1958 |
| 2,870,719 | Murray et al. | Jan. 27, 1959 |
| 2,870,720 | Lorenz | Jan. 27, 1959 |
| 2,931,303 | Dlugos | Apr. 5, 1960 |

FOREIGN PATENTS

| | | |
|---|---|---|
| 567,304 | Belgium | May 14, 1958 |
| 599,443 | Canada | June 7, 1960 |
| 1,055,365 | Germany | Apr. 16, 1959 |
| 1,073,038 | France | Mar. 17, 1954 |